DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 5, 1974

920 O.G. 9

T919,002

AROMATIC POLYSULPHONES PRODUCED BY OXIDATION OF AROMATIC POLYMERS

John Brewster Rose, Letchworth, and Ian Charles Taylor, Hertford, England, assignors to Imperial Chemical Industries Limited, London, England

Filed Jan. 19, 1973, Ser. No. 324,968
Claims priority, application Great Britain, Feb. 7, 1972, 5,488/72, 5,489/72
Int. Cl. C08g *23/00*
U.S. Cl. 260—49
No Drawing. 26 Pages Specification

Aromatic block copolymers are provided whose molecular chains comprise blocks having the formula

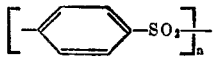

where $n$ is an integer having the value 2 or greater the blocks being linked by units and/or a plurality of units having the formula —Ar—Q— and optionally also —Ar—, in which Ar is a phenylene radical, preferably 1,4-phenylene and Q is —O—, —CO—, $—CR_1R_2—$, where $R_1$ and $R_2$ may be the same or different and represent hydrogen, lower alkyl, lower aryl and halogen substituted groups thereof. A preferred block copolymer comprises a chain which comprises blocks having the formula

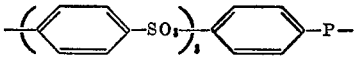

where P is selected from —O—, —CO— and $$—C(CH_3)_2—$$

These block copolymers may be formed by reacting the corresponding aromatic polysulphide with an oxidizing agent such as hydrogen peroxide in glacial acetic acid. A preferred method for making these block copolymers which have at least one unit having the formula —Ar—O— comprises reacting an alkali metal salt of at least one halophenol with a substantially equimolar mixture of at least one dihalobenzoid compound and a dialkali metal salt of at least one bisthiophenol in which the halogen atoms of the halophenol and dihalobenzenoid compound are activated by at least one electron-attracting group to form an aromatic polysulphide and then reacting the aromatic polysulphide with an oxidizing agent.